Feb. 20, 1968   J. W. SCONCE   3,369,808
JUMPER'S LANDING PIT
Filed Sept. 2, 1965   2 Sheets-Sheet 1
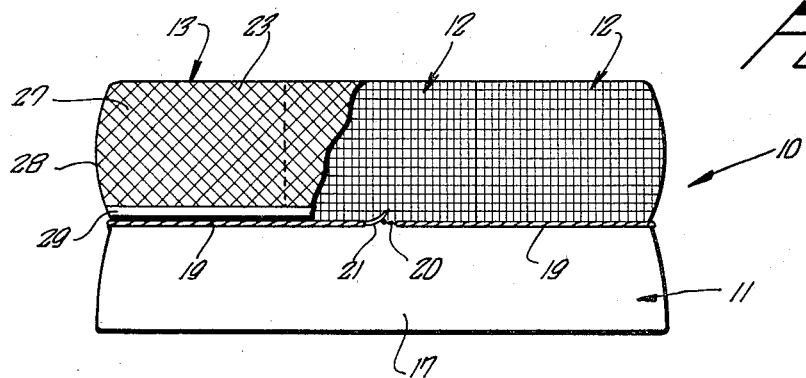
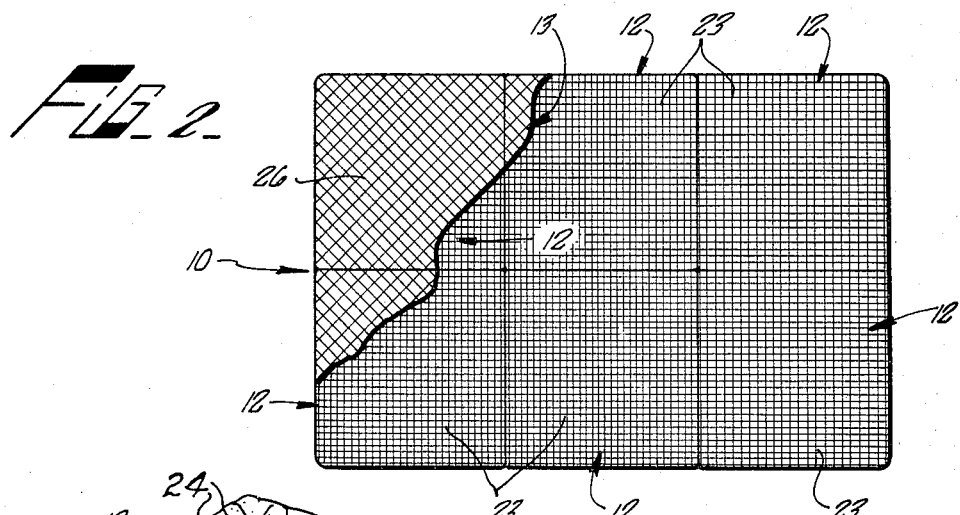
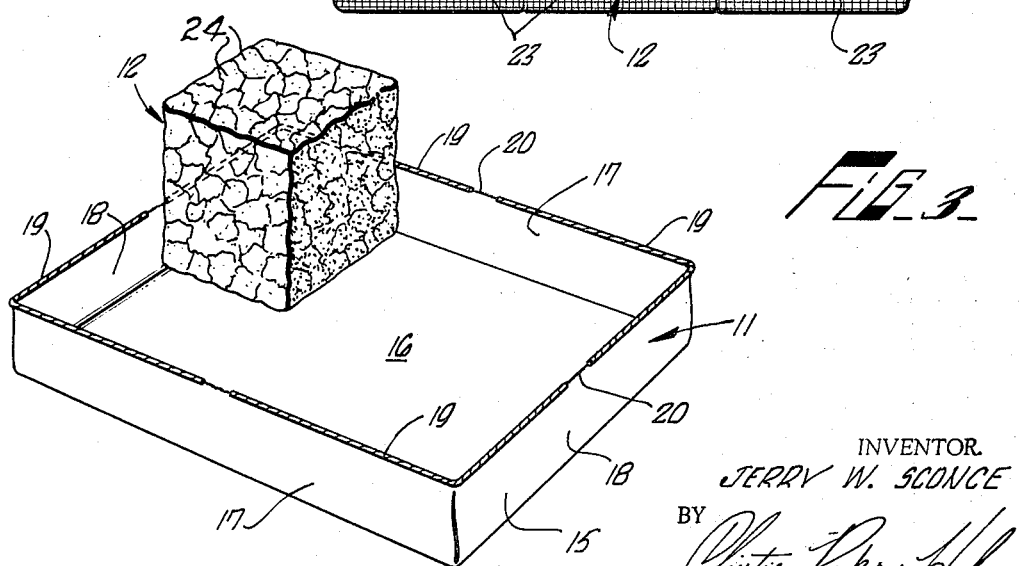
INVENTOR.
JERRY W. SCONCE
BY
Christie, Parker & Hale
ATTORNEYS.

Feb. 20, 1968 J. W. SCONCE 3,369,808
JUMPER'S LANDING PIT
Filed Sept. 2, 1965 2 Sheets-Sheet 2
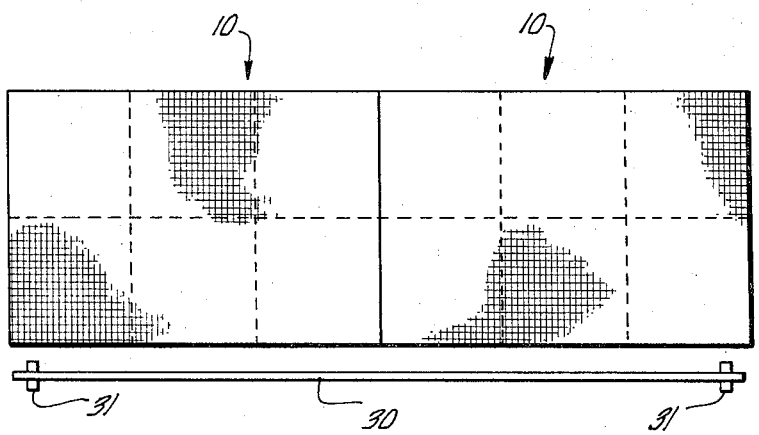
FIG. 4.
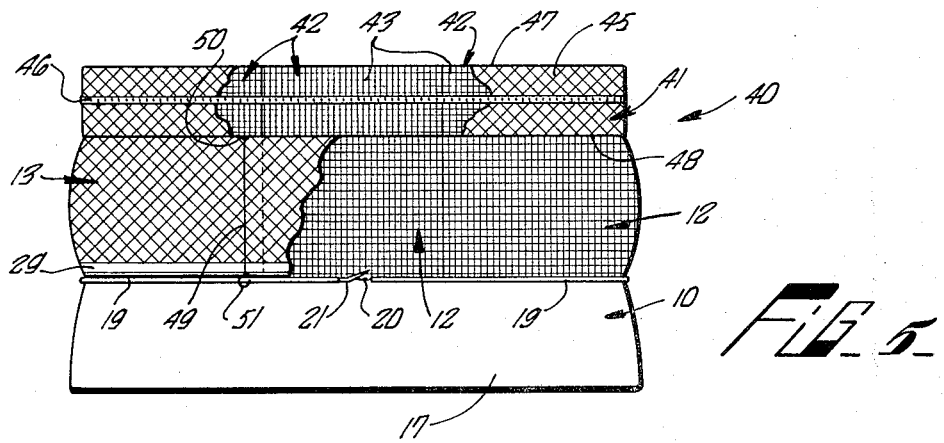
FIG. 5.
FIG. 6.
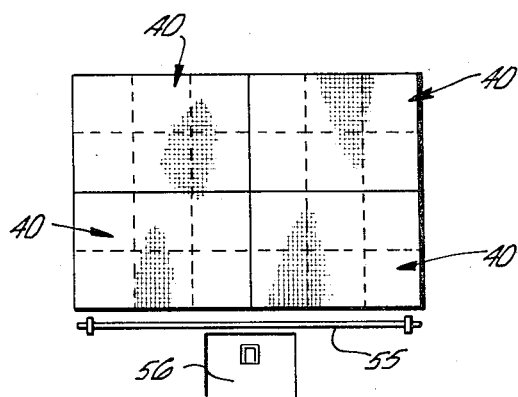
INVENTOR.
JERRY W. SCONCE
BY
Christie, Parker + Hale
ATTORNEYS.

United States Patent Office 3,369,808
Patented Feb. 20, 1968

3,369,808
JUMPER'S LANDING PIT
Jerry W. Sconce, 842 E. Cypress,
Glendora, Calif. 91740
Filed Sept. 2, 1965, Ser. No. 484,574
13 Claims. (Cl. 272—1)

This invention relates generally to athletic equipment. More particularly, it relates to apparatus providing a safe landing area for high jumpers, pole vaulters, and the like.

Recently many sawdust-filled landing pits for high jumpers and pole vaulters have been replaced by landing pits filled with pieces of spongy foamed rubber or resilient polyurethane foam. Often, the pieces of foamed rubber or polyurethane are covered with a canvas sheet which is pegged or otherwise secured to the ground around the landing pit. These landing pits provide a softer landing area than the sawdust filled pits they replaced, but they suffer from several disadvantages related to the fact that such landing pits are of a permanent nature.

First, since athletes participating in track and field events wear spiked shoes, the covers over the foam rubber landing pits become torn. As a result, rain can soak the pieces of foam rubber. The rain soaked pieces of foam are slow to dry and rapidly become rotted, thus requiring replacement. The foamed rubber used in such landing pits is relatively expensive. Further, there is the problem of destruction of these landing pits by vandalism. Not infrequently, the covers of such pits have been slashed by vandals. Also, the pieces of foam rubber, normally of fairly large size, have been shredded into uselessness by vandals.

This invention provides a novel, safe and effective landing pit for use by high jumpers and pole vaulters. The pit is comprised of easily handled components or modules which may be stored indoors in a safe place when the pit is not in use. Thus, the pit is portable and may be easily and rapidly removed from inclement weather and kept safe from vandals. Moreover, the modular construction of the pit provides for simple and economic replacement of parts which may become damaged by normal use.

Generally speaking, this invention provides a landing pit for high jumpers, pole vaulters, and the like. The pit includes an open-top receptacle and a plurality of substantially identical cushion units of substantially rectangular parallelepiped configuration. Each cushion unit includes an envelope filled with pieces of resilient foamed material. The cushion elements are disposed in the receptacle so that they fill the receptacle and project above the open top of the receptacle. The pit also includes a cover disposed over the upper portions of the cushion units.

The abovementioned and other features of this invention are more fully set forth in the following description of a presently preferred embodiment of the invention, which description is presented in conjunction with the accompanying drawings, wherein:

FIG. 1 is a side elevation view of a landing pit according to this invention;

FIG. 2 is a top plan view of the pit shown in FIG. 1;

FIG. 3 is a perspective view of the two components of the pit shown in FIGS. 1 and 2;

FIG. 4 is a top plan view of a high jump bar and of two landing pit assemblies like those shown in FIGS. 1–3;

FIG. 5 is a side elevation view of a landing pit assembly like that shown in FIG. 1 equipped with a supplemental cushion layer; and FIG. 6 is a top plan view of a pole vault bar and of four landing pit assemblies like that shown in FIG. 5.

As shown in FIGS. 1, 2 and 3, a jumper's landing pit assembly 10 according to this invention includes a base 11, a plurality of modular cushion units 12, and a cover 13. Preferably there are six cushion units disposed in the base, although the number of cushion units required to fill the base is not critical and may be varied without departing from the scope of the invention.

Base 11 is flexible and collapsible so that it may be transported and stored easily. The base is fabricated of heavy fabric material 15 to define an open-top receptacle for the cushion units. The fabric of the base is stitched so that the base has a bottom 16 having an area substantially equal to the total area of the lower ends of the cushion units. The base also has vertical side walls 17 and end walls 18. Preferably the fabric is treated to be water repellant. In a preferred landing pit, the base is fabricated of Naugahide. Also, in a presently preferred landing pit assembly 10, the base is 6 feet long and 5 feet wide. The top edge of the side and end walls are spaced 1 foot above the bottom of the base.

A stiff hollow tube 19, preferably made of plastic, is secured to the upper edge of the walls of the base at each corner of the base. Each tube extends along the edges of the walls from adjacent the center of a side wall 17 to adjacent the center of an end wall 18. A wire cable or heavy rope 20 is threaded through each tube and is secured externally of the tube at each of its ends to an over-center cable tensioning fastener 21 (see FIG. 1). Alternatively, two fasteners disposed opposite each other may be used; the tubes, however, are discontinuous at the middles of the side and end walls so that the base can be folded for easy movement and storage. The function of the cables and the tensioning fasteners is described below.

Cushion units 12 are substantially identical and are of rectangular parallelepiped configuration. The cushion units for the preferred pit assembly referred to above are 2½ feet high, 2½ feet deep (the dimension of the unit which is aligned transverse to the length of the base), and 2 feet wide. Each cushion unit includes an envelope or bag 23 filled with pieces of resilient foamed material 24 (see FIG. 3) which, for the purposes of illustration, shows a cushion unit without its envelope). The foamed material may be either foamed natural or synthetic rubber, but it is preferred that the envelope be filled with resilient polyurethane foam. It is preferred that the envelopes be made from a net material, such as a heavy nylon net material, or a very loosely woven fabric. The use of nylon net material is preferred, however, so that the foamed material which fills the envelope may dry quickly if it should become wet. Also, such net material is strong and resists rotting from dampness.

Cover 13 preferably is also fabricated from nylon net material. The cover has a top portion 26 which has the same area as the bottom of base 11. The cover has depending sides 27 and ends 28 which form a skirt relative to the top portion. The lower edges of the skirt carry a continuous length 29 of an elastic material. The cover is constructed so that, when it is in place over the cushion units fitted into the base, the elastic material lies just above the upper edges of the walls of the base. The cover is provided to retain the cushion units in place in the base and to cover the crevasses or cracks between the cushion units.

From the foregoing description, it is apparent that each component of pit assembly 10 is easily transportable by no more than two persons. Further, the cover and the base are constructed so they are collapsible into compact packages for storage. Such structure may be moved readily when desired and can be stored in a locked athletic equipment storage room safe from vandals.

FIG. 4 shows the use of two pit assemblies 10 with a high jump bar 30 supported on pedestals 31. The pit assemblies are placed in end-to-end relation behind bar 30. Preferably the pit assemblies are lashed together by ropes or cords (not shown) laced between the cable tubes at the abutted ends of the assemblies.

The erection of pit assembly 10 is a simple matter. The base is placed open on the ground at the desired location. Fasteners 21 are unoperated so that cables 20 are slack. The cushion units are then placed in the base in their proper relationship to each other. The walls of the base are then raised around the positioned cushion units; this may be done since cables 20 are slack. The fasteners are then closed to constrict the upper rim of the base so that the cushion units are held firmly in place. Operation of the fasteners causes the upper portions of the cushion units above the top of the receptacle base to bulge outwardly over tubes 19, thus assuring that a jumper landing on the pit assembly will not contact the tubes. The cover is then fitted over the upper ends of the cushion units.

Another jumper's landing pit assembly 40 is shown in FIG. 5. Pit assembly 40 includes base 11, cushion units 12 and cover 13, as described above, as well as an upper or supplemental cushion layer 41. The upper cushion layer is comprised of a plurality, preferably six, of modular cushion units 42 which are substantially identical to each other and have a rectangular parallelepiped configuration. Each cushion unit 42 includes an envelope or bag 43 fabricated of the same material as envelopes 23 and filled with the same type of resilient foamed material which fills cushion units 12. In conjunction with the preferred embodiment of assembly 10 referred to above, it is preferred that each cushion unit 42 be 8 inches thick, 2 feet wide, and 2½ feet long.

Cushion units 42 are disposed in a bag or pouch 45 which is fabricated from the same material as cover 13. Pouch 45 completely encloses the small cushion units. In order that cushion units 42 may be inserted into and removed from the pouch, the pouch is provided with a zipper 46 which extends around three sides of the pouch.

Upper cushion layer 41 has a top side 47 and a bottom side 48. At regular intervals around the edge of bottom side 48, individual ones of a plurality of hold-down cords 49 are secured to cover 45. The cords are connected to the cover via gussets 50 stitched to the cover. The cords depend from the gussets to their lower ends where each cord carries a hook 51 shaped for engagement with tubes 19. Preferably cords 49 are elastic. The cords, when the hooks are engaged with tubes 19 as shown in FIG. 5, hold the upper cushion layer in place on cushion units 12 and cover 13.

From the foregoing, it is apparent that assembly 40 is easily portable and storable like assembly 10.

Assembly 40 is especially suited for use by pole vaulters since it provides an increased cushioning effect over assembly 10. FIG. 6 shows four landing pit assemblies 40 arranged in side-by-side and end-to-end relation opposite a bar 55 from the end of a pole vaulter's runway 56. It is preferred that the individual assemblies be lashed together as described above with respect to FIG. 4.

In the accompanying drawings, the weave of envelopes 23 and 43 have been shown oriented on the bias relative to the weaves of covers 13 and 45, respectively. This relationship has been shown merely to clearly illustrate the invention and to provide drawings in which the various components of the invention are clearly discernible.

The invention has been described above by reference to presently preferred embodiments thereof. Workers skilled in the art to which the invention relates will appreciate that modifications and alterations may be made in the structures described without departing from the scope of the invention. Thus, the foregoing description is not to be regarded as limiting the scope of the invention.

What is claimed is:

1. A jumper's landing pit comprising an open-top receptacle, a plurality of substantially identical cushion units disposed in the receptacle to fill the same and to project above the top of the receptacle, each cushion unit comprising an envelope filled with pieces of resilient foamed material, the filled envelope having a substantially rectangular parallelepiped configuration, and a cover disposed over the upper portions of the cushion units.

2. Safe landing apparatus for a high jumper and the like comprising a flexible base having upwardly extending sides, a plurality of substantially identical cushion units disposed in the base to fill the same and to extend to upper ends thereof above the sides of the base, each cushion unit comprising a flexible envelope filled with pieces of resilient foamed material and constructed so that when filled the cushion unit has a substantially rectangular parallelepiped configuration, and a flexible cover member disposed over the upper ends of the cushion units.

3. A jumper's landing pit comprising a flexible open-top receptacle, a plurality of substantially identical cushion units fitted into the receptacle to fill the same and to project above the top of the receptacle, each cushion unit comprising an envelope filled with pieces of foamed material, the filled envelope having a substantially rectangular parallelepiped configuration, and a flexible cover fitted over the upper portions of the cushion units above the receptacle.

4. Safe landing apparatus for a high jumper and the like comprising a flexible base having upwardly extending sides and fabricated of heavy fabric material, a plurality of substantially identical cushion units disposed in the base to fill the same and to extend to upper ends thereof above the sides of the base, each cushion unit comprising a flexible envelope filled with pieces of resilient foamed material and constructed so that when filled the cushion unit has a substantially rectangular parallelepiped configuration, selectively operable means carried by the base operable for constricting the base along the upper edges of the sides thereof to retain the cushion units in the base, and a flexible cover member disposed over the upper ends of the cushion units.

5. Apparatus according to claim 4 wherein the envelope of each cushion unit is fabricated of net material.

6. Apparatus according to claim 5 wherein the cover is fabricated of net material.

7. Apparatus according to claim 6 including means for removably securing the cover to the cushion units.

8. Apparatus according to claim 7 wherein the cover has a top portion overlying the cushion units and the cover securing means comprises a skirt portion peripherally of the cover top portion depending from the top portion toward the upper extents of the base sides and a length of elastic material secured to the skirt portion around its extent along the lower edge thereof.

9. Apparatus according to claim 4 wherein the resilient foamed material is foamed polyurethane.

10. Apparatus according to claim 4 wherein the base has a rectangular configuration in top plan view and the selectively operable means comprises a tube secured to the upper extents of the base sides at each corner of the base, each tube extending from its corner of the base along the upper extents of the adjacent base sides to open ends disposed substantially at the midlength of each of the adjacent base sides, cable means threaded through the tubes around the upper extents of the base sides, and means engaged with the cable means operable for reducing the extent of the cable means around the base.

11. Apparatus according to claim 10 wherein the cable means comprises an inelastic cable threaded through each tube between ends of the cable disposed outwardly of and adjacent to the ends of its tube, and the means operable for reducing the extent of the cable means comprises a fastener connected between the ends of the cables extending from the opposed ends of adjacent tubes at substantially the midlength of each base side, each fastener having an opened condition and a closed condition, the distance between the ends of the cables connected to each fastener being greater when the fastener is in its open condition than when the fastener is in its closed condition.

12. Apparatus according to claim 4 including a supplemental cushion layer disposed over and supported by the cushion units, the supplemental cushion layer comprising a plurality of substantially identical cushion units of substantially rectangular parallelepiped configuration each comprised of a flexible envelope filled with pieces of resilient foamed material, the cushion units of the supplemental cushion layer being disposed in an openable flexible enclosing bag, and means engageable between the bag and the base for holding the supplemental layer in position on the cushion units disposed in the base.

13. Safe landing apparatus for a high jumper and the like comprising a flexible base having a rectangular bottom and upwardly extending sides and fabricated of heavy fabric material, a plurality of substantially identical principal cushion units removably fitted into the base to cover the bottom and to extend to upper ends thereof above the sides of the base, each principal cushion unit comprising a flexible envelope fabricated of open-weave fabric-like material filled with pieces of resilient foamed polyurethane and constructed so that when filled the cushion unit has a substantially rectangular parallelepiped configuration, a flexible cover fabricated of open-weave fabric-like material and having a top portion and a depending peripheral skirt removably disposed over the upper ends of the principal cushion units, a length of elastic material secured to the cover around the lower periphery of the skirt which is extended from its relaxed condition when the cover is in position over the principal cushion units to secure the cover in position, a hollow tube secured to the upper extents of the base side walls at each corner of the base and extending along the upper extents of the adjacent side walls to opposite open ends at substantially the midlengths of the adjacent side walls, an inelastic cable extended through each tube between opposite ends thereof disposed outwardly of the ends of the tube, an over-center cable tensioning fastener disposed between the opposing ends of the tubes opening toward each other along side walls and connected between the ends of the cables engaged in said tubes, the fasteners being operable to reduce the total effective length of the cables to constrict the base about the principal cushion units to securely retain said units in the base, a supplemental cushion layer disposed over and supported on the principal cushion units, the supplemental layer being and including a plurality of substantially identical supplemental cushion units of substantially rectangular parallelepiped configuration each comprised of a flexible envelope fabricated of open-weave fabric-like material filled with pieces of resilient foamed polyurethane, an openable bag fabricated of open-weave fabric-like material in which the supplemental cushion units are disposed, a plurality of elastic cords secured to the bag at spaced locations on the bag and extending downwardly from the bag to lower ends adjacent the tubes, and means carried by each cord at the lower end thereof releasably engageable with the adjacent tube for securing the supplemental cushion layer in position on the principal cushion units.

References Cited
UNITED STATES PATENTS

| | | | |
|---|---|---|---|
| 1,211,548 | 1/1917 | Courts | 5—355 |
| 1,356,148 | 10/1920 | Hobert | 5—355 |
| 3,204,259 | 9/1965 | Gordon | 5—355 |
| 3,262,134 | 7/1966 | Bramble | 5—344 |

ANTON O. OECHSLE, *Primary Examiner.*

A. W. KRAMER, *Assistant Examiner.*